Nov. 13, 1951   S. R. GIACOLETTO   2,574,780
RAT TRAP
Filed May 1, 1946   8 Sheets-Sheet 1
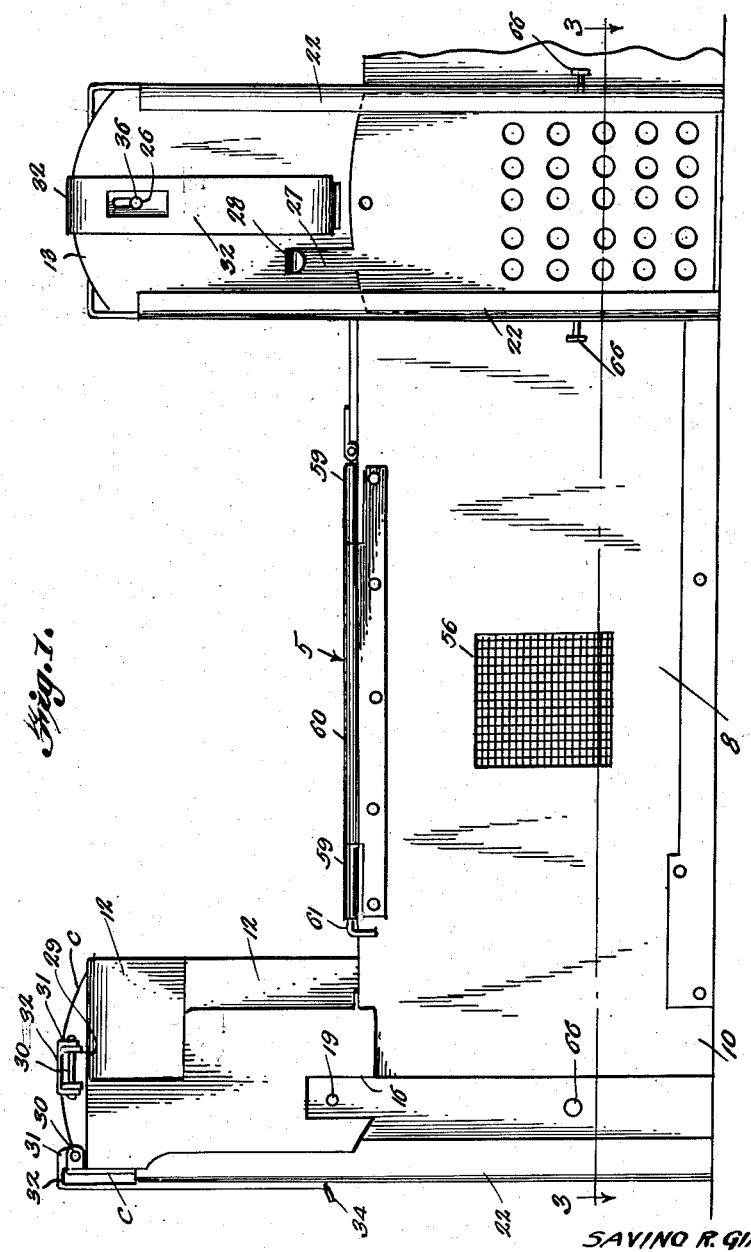
Inventor
SAVINO R. GIACOLETTO
By Randolph & Beavers
Attorneys

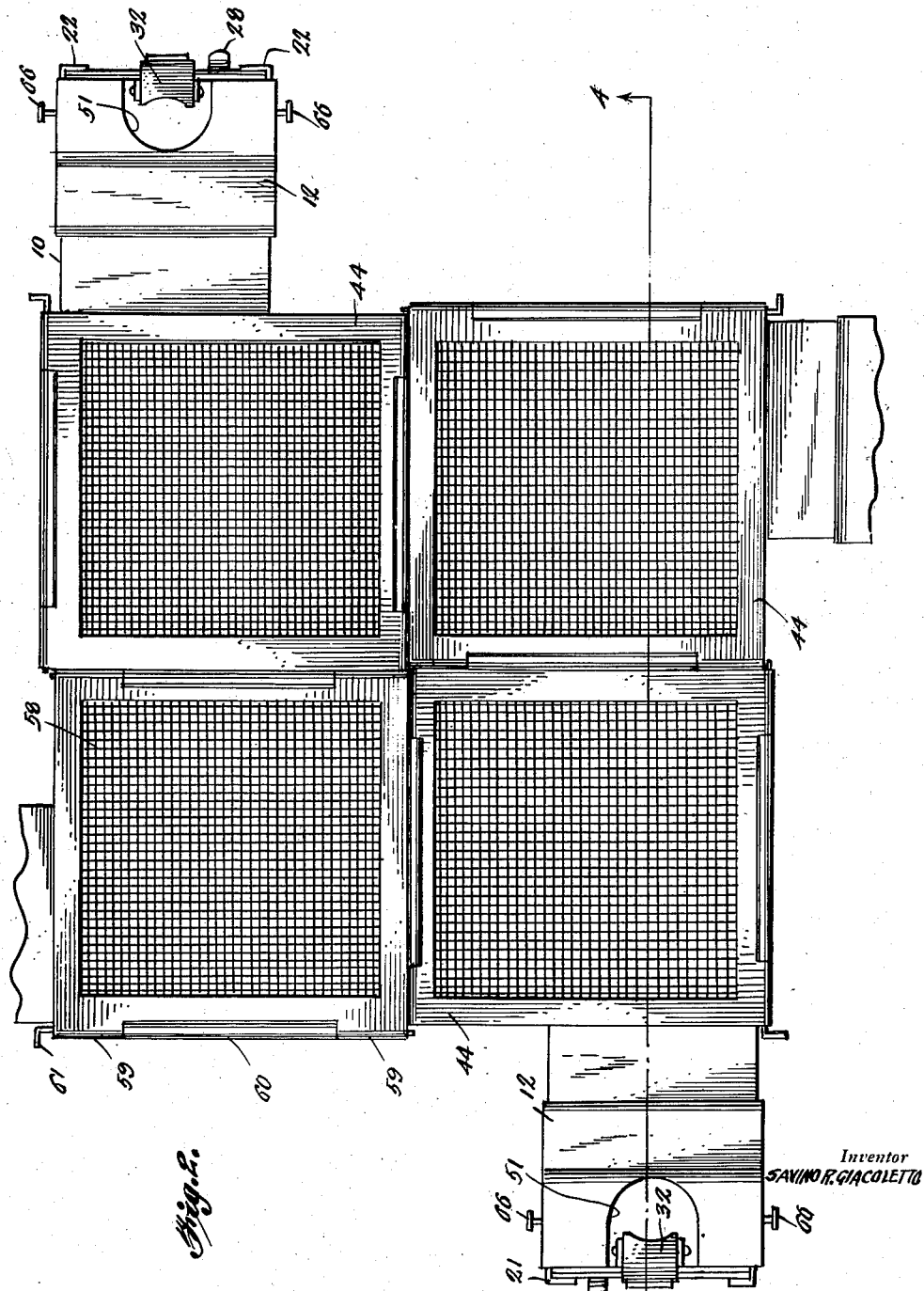

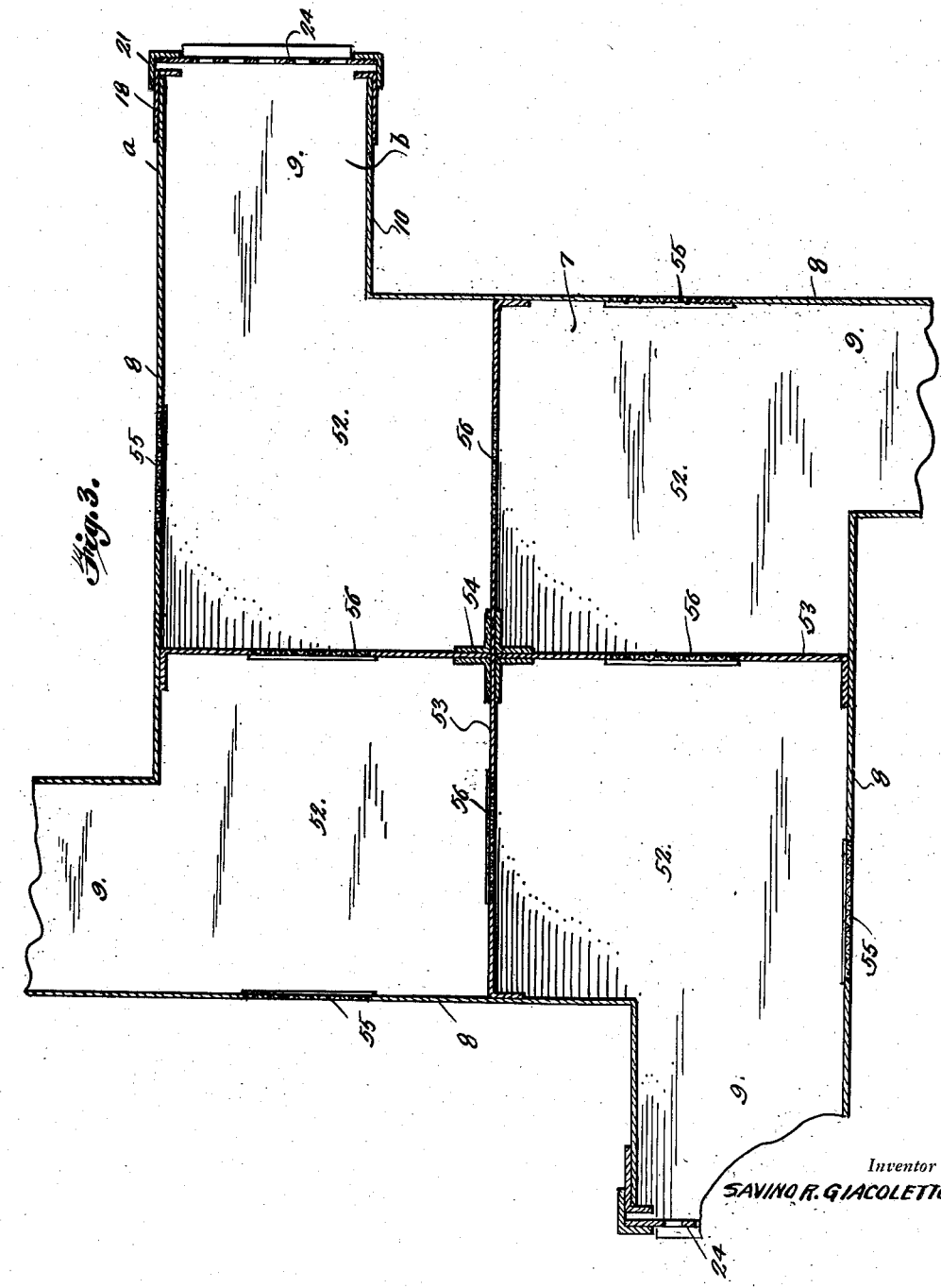

Nov. 13, 1951 S. R. GIACOLETTO 2,574,780
RAT TRAP
Filed May 1, 1946 8 Sheets-Sheet 4
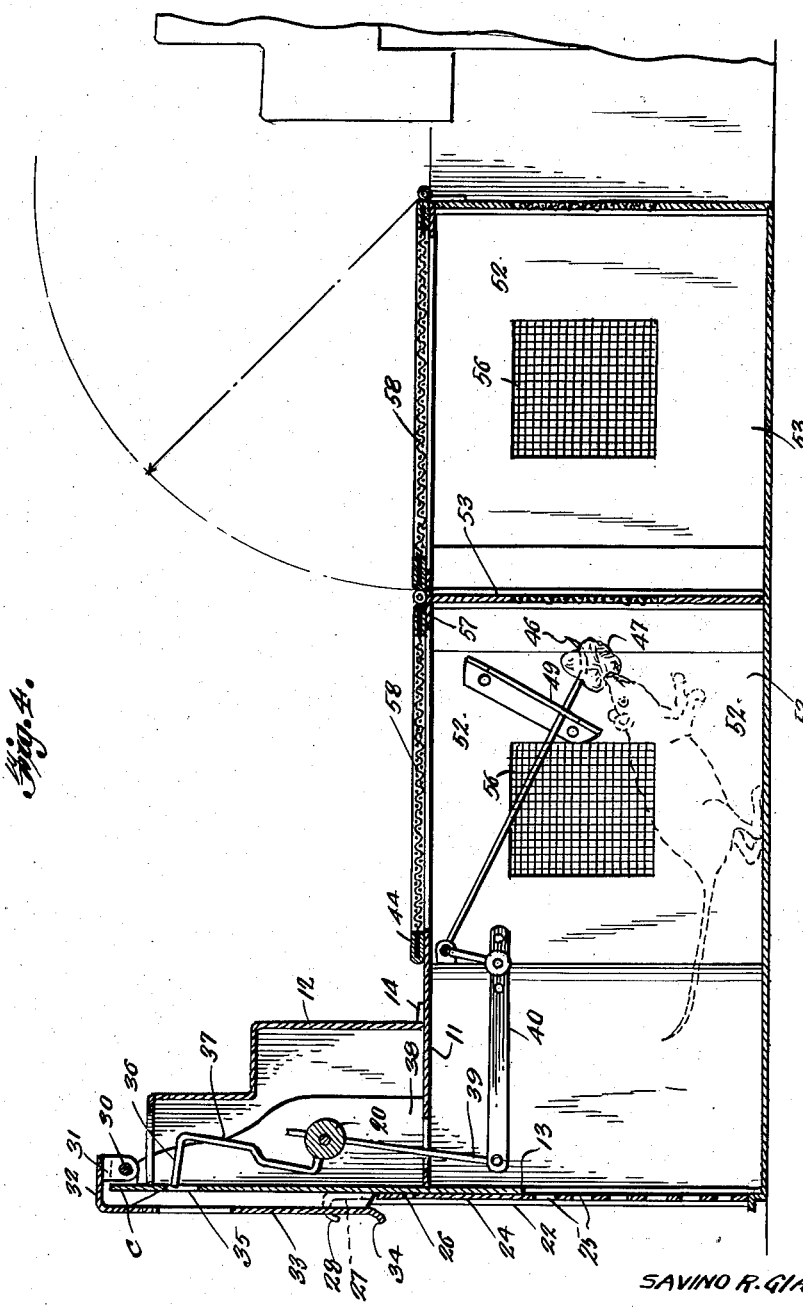
Inventor
SAVINO R. GIACOLETTO
By Randolph & Beavers
Attorneys

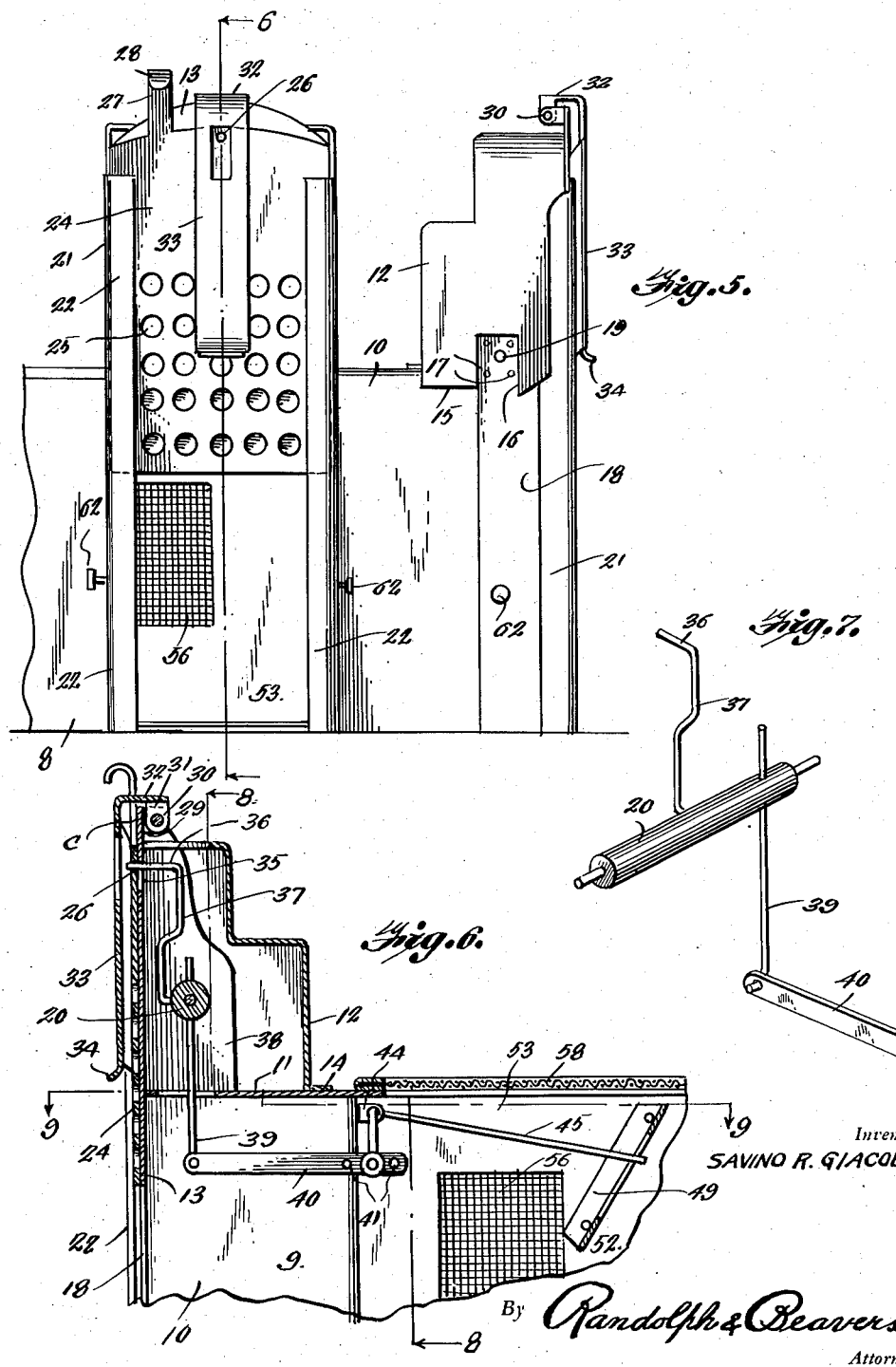

Nov. 13, 1951     S. R. GIACOLETTO     2,574,780
RAT TRAP
Filed May 1, 1946     8 Sheets-Sheet 6
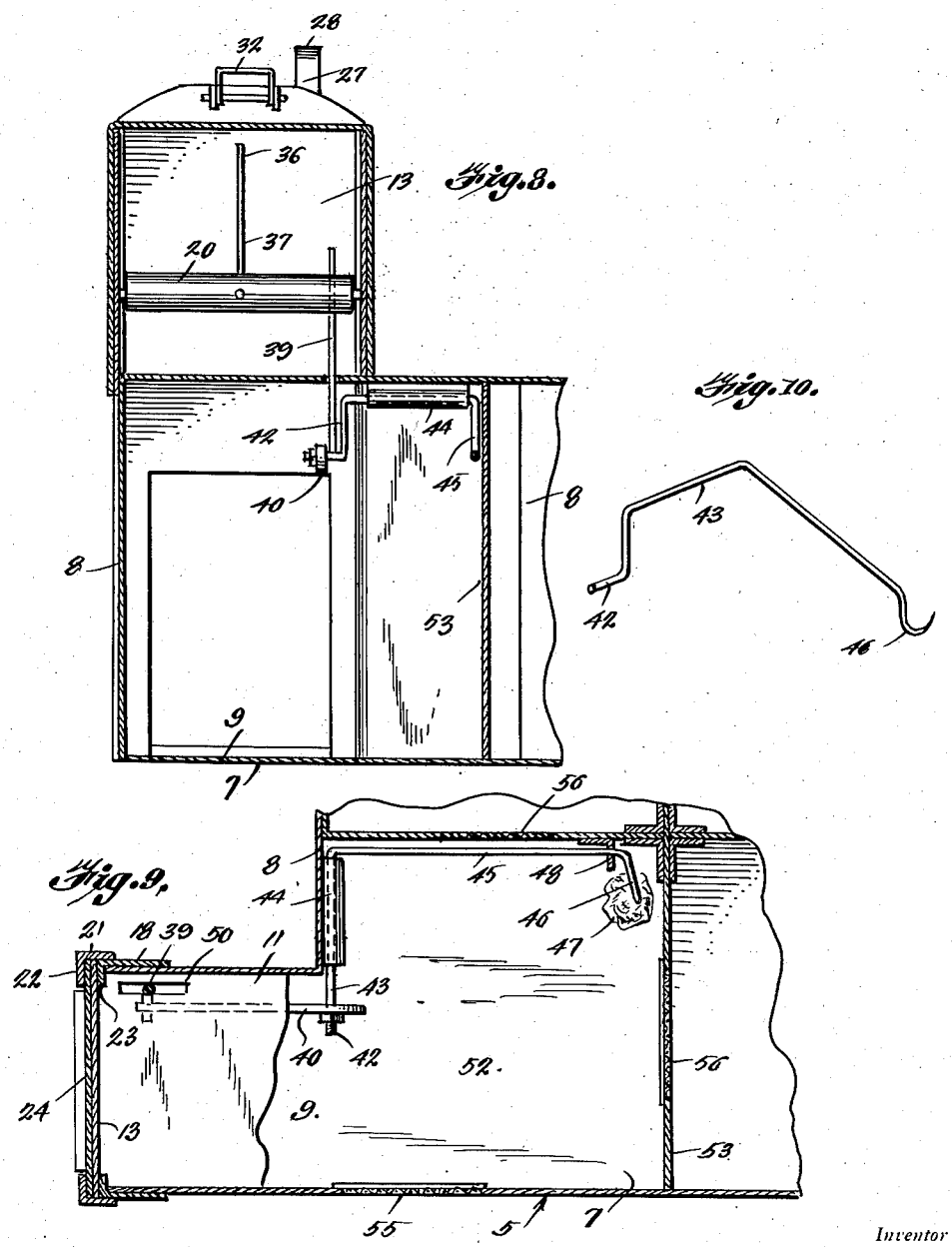
Inventor
SAVINO R. GIACOLETTO
By Randolph & Beavers
Attorneys Nov. 13, 1951  S. R. GIACOLETTO  2,574,780
RAT TRAP
Filed May 1, 1946  8 Sheets-Sheet 7
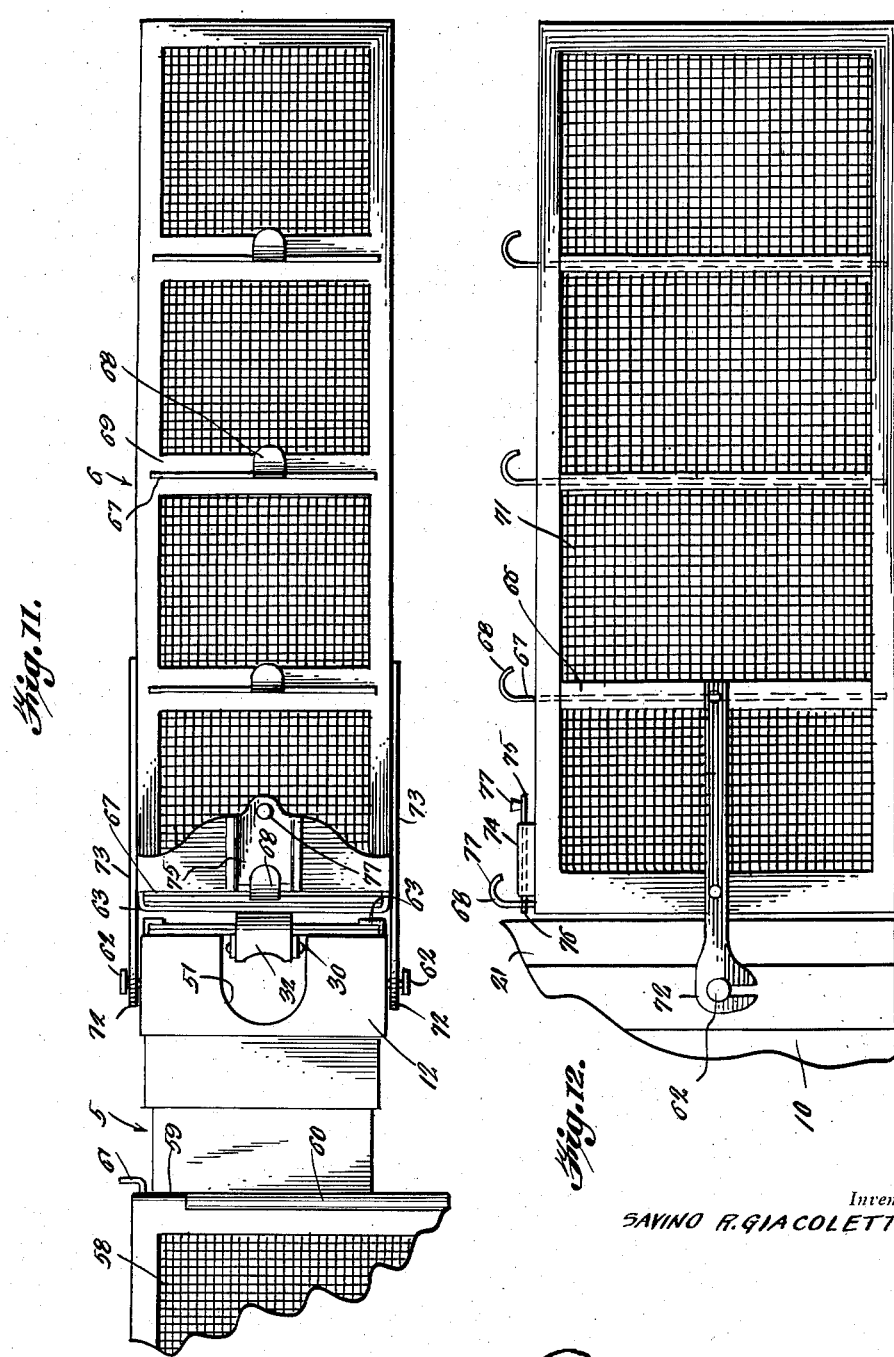
Inventor
SAVINO R. GIACOLETTO
By Randolph & Beavers
Attorneys Nov. 13, 1951 — S. R. GIACOLETTO — 2,574,780
RAT TRAP
Filed May 1, 1946 — 8 Sheets-Sheet 8
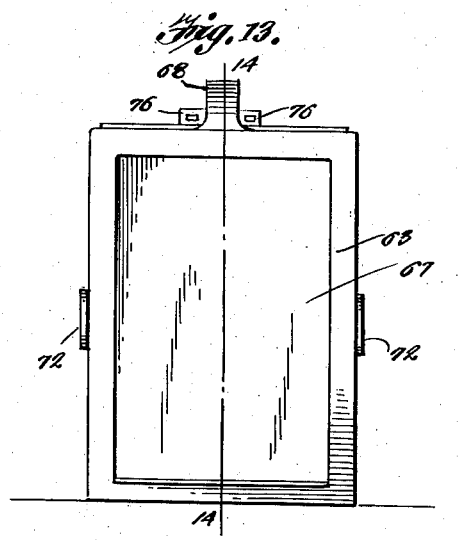
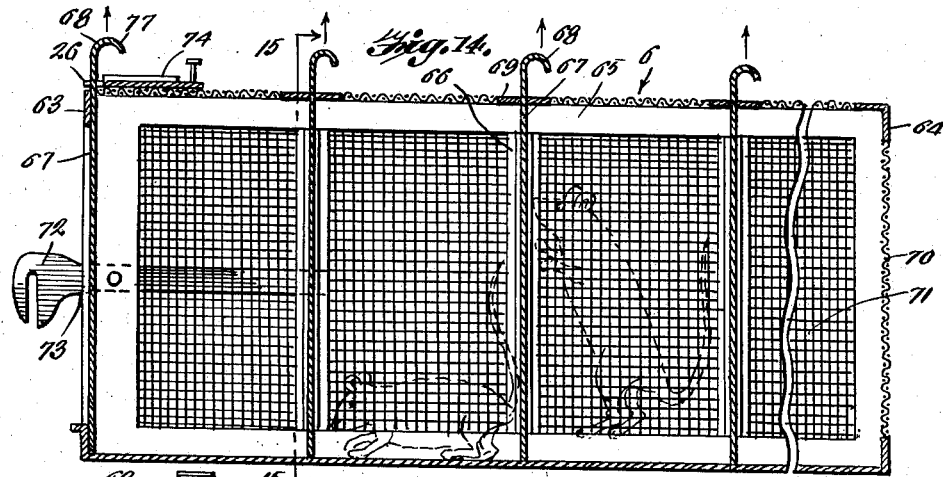
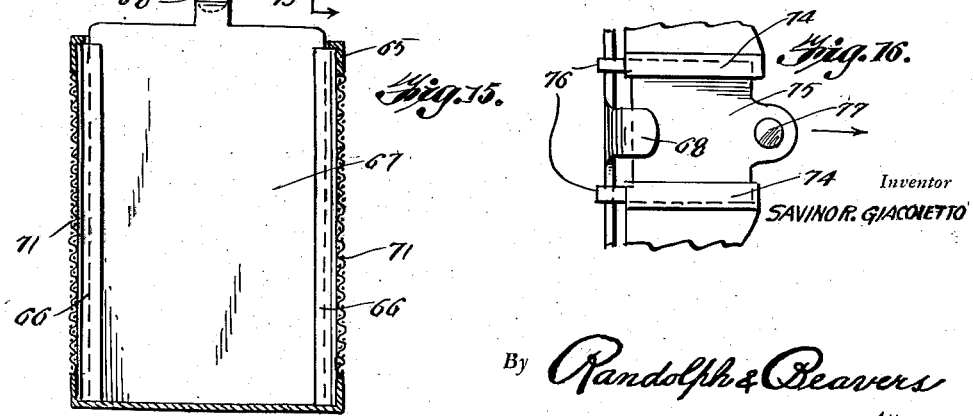
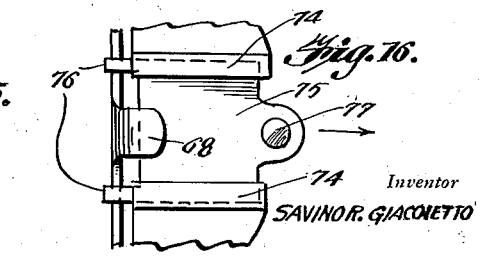
Inventor
SAVINO R. GIACOLETTO
By Randolph & Beavers
Attorneys Patented Nov. 13, 1951

2,574,780

UNITED STATES PATENT OFFICE 2,574,780

RAT TRAP

Savino R. Giacoletto, San Francisco, Calif.

Application May 1, 1946, Serial No. 666,408

1 Claim. (Cl. 43—61)

The present invention relates to animal traps and more particularly to traps for catching rats and other rodents.

An important object of the invention is to provide a trap having multiple facilities for catching rodents, to the end that such a trap can be placed in thickly rat populated localities for catching a plurality of rats, as distinguished from present day traps, chiefly used for single catches.

Another important object of the invention is to provide a multiple type trap and in conjunction therewith, a storage cage into which caught rats can be lodged for future disposal.

A further object of the invention is to provide a trap of the character stated, capable of being easily set for operation and wherein there is practically no danger of injury to the person handling the same.

Still a further object of the invention is to provide a trap which removes the hazard of personal injury to attendants, due to the provision of a drop gate instead of striker means, such as is employed in most other traps.

These and various other important objects and advantages of the invention will become apparent to the reader of the following description.

In the drawings:

Figure 1 is a side elevational view of the trap, the four sides being of like appearance;

Figure 2 is a fragmentary top plan view of the trap;

Figure 3 is a horizontal sectional view taken substantially on line 3—3 of Figure 1;

Figure 4 is a fragmentary vertical sectional view taken on line 4—4 of Figure 2;

Figure 5 is a fragmentary side elevational view showing the gate in elevated position;

Figure 6 is a fragmentary vertical sectional view taken on line 6—6 of Figure 5;

Figure 7 is a fragmentary perspective view of the latch means;

Figure 8 is a fragmentary vertical sectional view taken on line 8—8 of Figure 6;

Figure 9 is a fragmentary horizontal sectional view taken on line 9—9 of Figure 6;

Figure 10 is a perspective view of the crank shaft and bait arm;

Figure 11 is a fragmentary top plan view showing the collection cage attached to the trap;

Figure 12 is a side elevational view of the structure shown in Figure 11;

Figure 13 is an inner end elevational view of the collection cage;

Figure 14 is a longitudinal vertical sectional view taken on line 14—14 of Figure 13;

Figure 15 is a transverse vertical sectional view taken on line 15—15 of Figure 14;

Figure 16 is a fragmentary top plan view of the attaching end of the collection cage.

Referring to the drawings, the apparatus is made up of a pair of units, namely the trap proper generally referred to by numeral 5 and a collection cage generally referred to by numeral 6 (see Figure 11).

The trap 5 is made up of a bottom wall 7 (see Figure 3) and four side walls 8, each of which has a portion $a$ in one direction beyond the side of an adjacent wall 8 and spaced from its terminus to form a short corridor 9 in complement with a short wall 10 extending from said adjacent wall 8. The floor 7 is likewise provided with an extension $b$ and these corridors each has a top plate 11 (see Figure 6) above which rises a tower 12, preferably of stepped construction, as shown in Figure 6, this tower having a front wall 13 which extends downwardly and to a point a short distance below the top plate 11. The tower 12 is removable from the top plate 11, the same having a back flange 14 for rest upon the top plate 11 and depending side portions 15 for straddling the side walls 8, 10, as in the manner shown in Figure 5, these side portions 11 having notched out portions 16 to make accessible openings 17 in vertical strips 18 at the outer ends of the walls 8, 10, through any one of which the pintle ends 19 of a rotor 20 are disposed.

Complemental guide strips 21 are provided at the outer ends of the walls 8, 10 and these are flanged inwardly as at 22 (see Figure 9) to cooperate with flanges 23 on the vertical strips 18 in forming a guideway for a vertically movable closure gate 24.

The closure gate 24 may have perforations 25 therein, but definitely has a small opening 26 at its upper portion and also an upstanding tongue 27 having a finger hook 28 at its upper end.

As is clearly shown in Figure 6, the wall 13 forming a front for the tower 12, extends upwardly above the top of the tower, as at $c$ and has ears 29 through which a pivot pin 30 extends, this pin also extending through parallel ears 31 on the right angularly disposed foot 32 of a hand lever 33, this lever having an outwardly disposed lip 34 at its lower end whereby it can be lifted conveniently from its position shown in Figure 6.

When the gate 24 is in elevated position, the small opening 26 will register with a slot 35 in the upper portion of the wall 13, below the top of the tower 12.

Through the slot 35 and the opening 26, a pintle 36 is slidable, this pintle being carried by the upper end of a rod 37, which rises from the rotor 20, and at this point, it can be seen that the upper portions of the strips 18 are preferably widened as at 38 to form a substantial support for the rotor 20.

Frictionally disposed through an opening in the rotor 20 is a depending rod 39, which pivotally connects at its lower end to a link bar 40, this link bar in turn having openings 41 at its inner end for receiving the crank end 42 of a crank shaft 43, this crank shaft being journaled through suitable bearings 44, on the adjacent wall 8. This bearing 44 may be a barrel, as shown in Figure 9.

From the opposite end of the crank shaft 43 and at right angles thereto, projects a bait arm 45 having a laterally disposed bait carrying hook 46 on which any suitable bait 47 can be placed.

For this end of the arm 45, a flanged guide or cleat 48 is provided, this cleat being slotted as at 49 to receive and guide this end of the arm 45.

As is shown in Figure 9, the corridor top plate 11 has a slot 50 therein to allow for the movement of the depending rod 39.

The top of the tower 12 has a cut-away portion 51 through which the foot 32 is movable. The weight of the bait arm 45 will normally hold the latch pintle 36 retracted, when the gate 24 is lifted so that the opening 26 matches the slot 35 and the lever 33 is swung upwardly, the engagement of a foot 32 behind the heel of the pintle rod structure 36, 37 and further the movement of said arm 33 will urge the pintle 36 through the slotted opening to hold the gate in elevated position and the weight of the gate on the pin will overcome the gravitating effect of the arm 45, with the result that the arm will be held in the elevated position shown in Figure 6. Obviously, when a rodent engages the bait on the hook 46 and pulls downwardly, the crank shaft 43 will be rocked and the rod 39 pulled to partly rotate the rotor 20 and swing the pintle 36 away from the wall 13, thus releasing the gate and trapping an animal in the corresponding compartment.

As is apparent in Figure 3, the interior of the trap is divided into four compartments 52, formed by four right angularly disposed partitions 53, radiating from a hub frame 54 to connect to opposed portions of the walls 8, all as in the manner shown in Figure 3.

It is also preferable that the walls 8 and the partitions 53 be provided with mesh filled windows 55, 56, respectively.

The top of the trap, as shown in Figure 4 has flanges 57 on the partitions 53 and to these are hinged mesh filled trap doors 58, each of which has barrels 59, 59, at its outer edge adapted to interlap a barrel formation on the upper edge of the opposed wall 8, in order to receive a securing pin 61, all as in the manner shown in Figure 2.

To accommodate the collection cage 6, the side walls of each corridor 9 has outwardly projecting and headed studs 62 and the use of these studs will be described in connection with the description of the collection cage, which will follow a description of the operation of the trap immediately hereafter.

In the operation of the trap, assume that the gate 24 is in elevated position, as shown in Figure 6. A rat or other rodent enters the corresponding corridor 9 and compartment 52, and seeing the bait 47 on the raised hook 46, will grasp the bait and in pulling the same down to a convenient level for eating, will move the arm 45 downwardly, which through the action of the crank shaft 43, will move the link bar 40 outwardly, rotating the rotor 20 and swinging the rod 37 inwardly, to the end that the pin 36 is removed from the opening 26 of the gate 24, allowing the gate to gravitate, thus shutting off the escape of the rodent.

In order to reset the trap, the gate 24 is lifted until the opening 26 is opposite the slot 35, after which the lever 33 is moved upwardly and backwardly, so that the foot 32 rides against the heel of the pin and rod structure 36, 37 and moves the pin outwardly through the slot and opening, thus holding the gate in elevated position.

Of course, the rodents can be annihilated by lifting the closures 58 to gain access to the compartments 52, but normally these closures 58 permit access to the compartments 52, in order that the hooks 46 can be baited.

The collection of the live rodents is accomplished through the medium of the collection cage, shown in Figures 11 to 16 inclusive. The cage 6 is made up of a bottom, flanged at its side and end edges in an upward direction, this cage being provided with front and rear end frames 63, 64 respectively, connected by upper side frame members 65, between which and the side flanges of the bottom slide ways 66 are provided to receive equi-distantly spaced gates 67, each having a curved handle 68 at its upper end, these gates operating through slotted bridge members 69, spanning the top of the cage, and one of these gates 67 being located at the front end of the cage, while the back end is closed by a mesh filler 70. The sides and top of the cage are also closed by mesh sheets 71 which while precluding the escape of the rodents, permits an observer to ascertain whether there are any creatures therein.

Vertically slotted members or hooks 72 having shank portions 73 secured to opposite sides of the cage 6, project forwardly from the cage and are engageable over the headed studs 62, when it is desired to transfer rodents from the trap to this collection cage.

At the forward end of the cage and at the top side thereof are spaced slide ways 74, 74 in which a latch plate 75 is movable, this latch plate having protrusions 76, 76, adapted to override the upper edge of the forward end gate 67, so that when transporting the cage there is no likelihood of the gate coming open and rodents escaping. The latch plate 75 has a short upstanding handle or knob 77.

The cage 6, when disconnected from the trap 5 can be lowered into a pail or tank of water for the purpose of drowning the rodents.

While the foregoing description sets forth the invention in specific terms, it is to be understood that numerous changes in the shape, size and materials may be resorted to, without departing from the spirit and scope of the invention as claimed hereinafter.

Having described the invention, what is claimed as new is:

A multiple animal trap comprising a housing divided into a plurality of compartments, a closure for each of the compartments and bait carrying animal actuated means for each closure, and a collection cage for collecting animals from the compartments, and detachable connecting means between the cage and the trap at each entrance, said connection being in the form of stud and hook elements on said cage and trap, said collection cage having a plurality of vertically movable doors slidably mounted therein to form a plurality of compartments in said collection cage.

SAVINO R. GIACOLETTO.

REFERENCES CITED

The following references are of record in the file of this patent:

UNITED STATES PATENTS

| Number | Name | Date |
|---|---|---|
| 443,975 | Pead | Dec. 30, 1890 |
| 488,111 | Bromwell | Dec. 13, 1892 |
| 1,255,798 | Schuckman | Feb. 5, 1918 |
| 1,453,615 | Bauman | May 1, 1923 |
| 1,552,288 | Ford | Sept. 1, 1925 |
| 1,554,079 | Frick | Sept. 15, 1925 |
| 1,713,167 | Bushman | May 14, 1929 |
| 1,747,108 | Evans | Feb. 11, 1930 |
| 1,861,478 | Kleffman | June 7, 1932 |
| 2,228,787 | Snyder | Jan. 14, 1941 |
| 2,410,879 | Hegener | Nov. 12, 1946 |